United States Patent
Rowe

[11] Patent Number: 5,893,297
[45] Date of Patent: Apr. 13, 1999

[54] HANDLEBAR HANDGRIP

[76] Inventor: Kenneth R. Rowe, 3786 Snowden Hill Rd., New Hartford, N.Y. 13143

[21] Appl. No.: 08/773,275

[22] Filed: Dec. 23, 1996

[51] Int. Cl.⁶ .................................................. B62K 21/26
[52] U.S. Cl. ............................... 74/551.9; 74/558.5
[58] Field of Search ................... 74/551.9, 558.5, 74/558, 551.8; 24/20 TT

[56] References Cited

U.S. PATENT DOCUMENTS

| | | | |
|---|---|---|---|
| 971,519 | 10/1910 | Brannen | 24/20 TT X |
| 2,098,509 | 11/1937 | Morgan | 74/551.9 |
| 4,158,407 | 6/1979 | Rest | 74/558.5 X |
| 4,580,319 | 4/1986 | Paradis | 24/20 TT X |
| 5,125,286 | 6/1992 | Wilson | 74/551.9 |
| 5,213,007 | 5/1993 | Yoo | 74/558 |
| 5,224,397 | 7/1993 | Yoo | 74/558 |
| 5,280,735 | 1/1994 | Kulpers et al. | 74/551.9 |
| 5,325,737 | 7/1994 | Bendetti | 74/551.9 |
| 5,390,395 | 2/1995 | Oetiker | 24/20 TT X |

FOREIGN PATENT DOCUMENTS

| | | | |
|---|---|---|---|
| 446896 | 12/1912 | France | 74/551.9 |
| 10625 | of 1894 | United Kingdom | 74/551.9 |
| 330243 | 6/1930 | United Kingdom | 74/551.9 |

*Primary Examiner*—Charles A. Marmor
*Assistant Examiner*—Mary Ann Battista
*Attorney, Agent, or Firm*—Robert O. Wright

[57] ABSTRACT

A tie for securing a handgrip to a handle bar has a series of short rods formed along the outer surface which project radially outwardly when fastened about a handgrip to provide a handlebar handgrip assembly with an improved frictional surface for the hand of an operator and improved frictional contact between handlebar and handgrip. The ties may be made in multiple colors and textures for different styling effects.

4 Claims, 2 Drawing Sheets

5,893,297

1

HANDLEBAR HANDGRIP

This invention relates to handgrips for use on handlebars of bicycles, motorcycles, and other devices and to ties for securely affixing such grips to handlebars. More particularly this invention concerns friction enhancing ties that when affixed about a handlegrip on a handlebar provide a superior frictional gripping surface for the hand of the user and improved friction between grip and bar.

BACKGROUND OF INVENTION

In todays sophisticated sports vehicles handgrips for handlebars used to operated the vehicle have become important safety, comfort and style components. Functionally handgrips must be capable of providing positive, non-slip gripping of the handlebar and yet be comfortable for extended periods of use. Also handgrips have become somewhat of a style setting item on these vehicles with a wide variety of colors and designs appearing on the market.

Examples of previous proposed solutions to the safety and comfort problems are shown in U.S. Pat. Nos. 5,125,286 to Wilson and 5,280,735 to Kulpers et al. The latter shows screw actuated clamps to secure the grips to the handlebar and the former twisted safety wires to secure the grips to the handlebar. The twisted wires are unsightly and can cause injury if not applied carefully. Clamps are expensive and tend to be bulky. Neither offer designers much to work with from a style standpoint.

Further the frictional surfaces disclosed by the prior art leave much to be desired. Kulpers' rigid outer sleeve is at best uncomfortable and Wilson's grip looses much of its frictional ability when wet and dirty.

OBJECTS AND SUMMARY OF INVENTION

Accordingly it is an object of the present invention to overcome the limitations of the prior art.

It is another object of the present invention to provide a handgrip and ties that when applied both securely affix the grip to the handlebar and improve the frictional gripping surface.

It is a further object to provide a functionally superior grip and tie that also provides a stylish accent to the applied handgrip and handlebar.

It is another object of the present invention to provide a handgrip and tie that provide a superior frictional surface even when wet and dirty.

A still further object is to provide handgrip ties in a variety of colors to match and/or compliment the particular style of a vehicle and handlebar.

These and other and further objects are achieved in one embodiment wherein a handgrip having at least three annular grooves spaced therealong is secured to a handlebar by a corresponding number of multicolored ties having a series of short rods projecting outwardly therefrom. The ties when used to fasten a grip to a handlebar, provide a superior frictional handgrip surface.

2

DESCRIPTION OF PREFERRED EMBODIMENT

Figure 3:
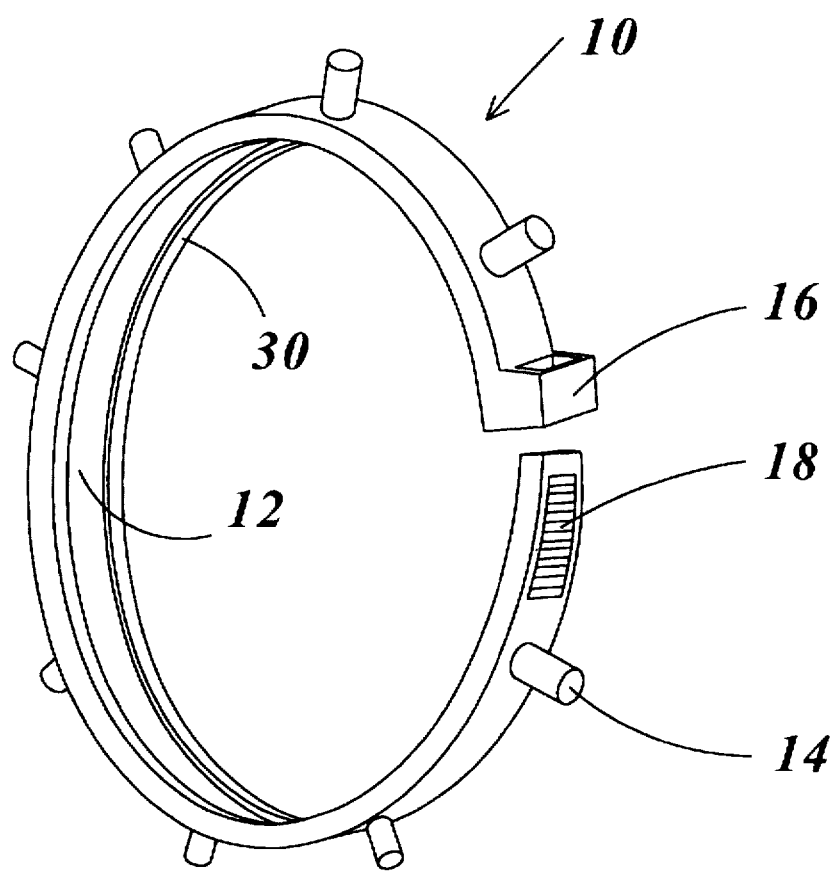
FIG. 3 is a perspective view of a tie.

FIG. 3 shows a tie 10 according to the present invention. Tie 10 is a narrow, elongated strap having a generally rectangular cross-section. The length is chosen to extend around a handgrip to be fastened to a handlebar. An annular groove 12 is formed on the inner surface of the tie. Positioned about the outer surface of the tie, at spaced intervals, are cylindrical rods 14 which are adapted to extend generally radially from the handgrip when a tie is installed thereon. Tie 10 has formed at one end a latch or locking box 16 and at the other end a tightening ratchet 18.

Figure 1:
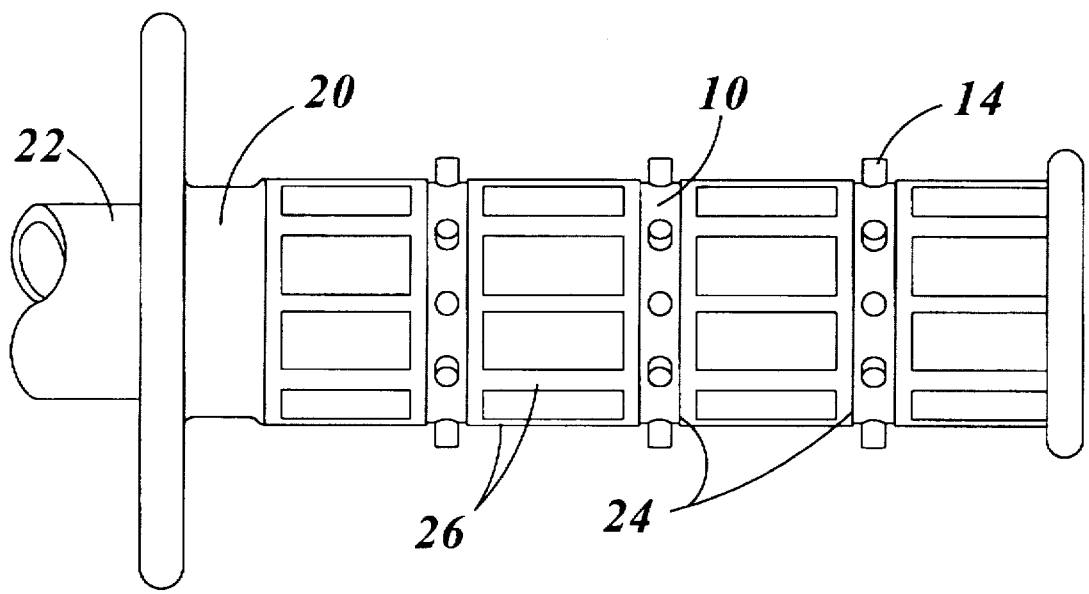
FIG. 1 is a side view of a grip mounted on a handlebar.
Figure 2:
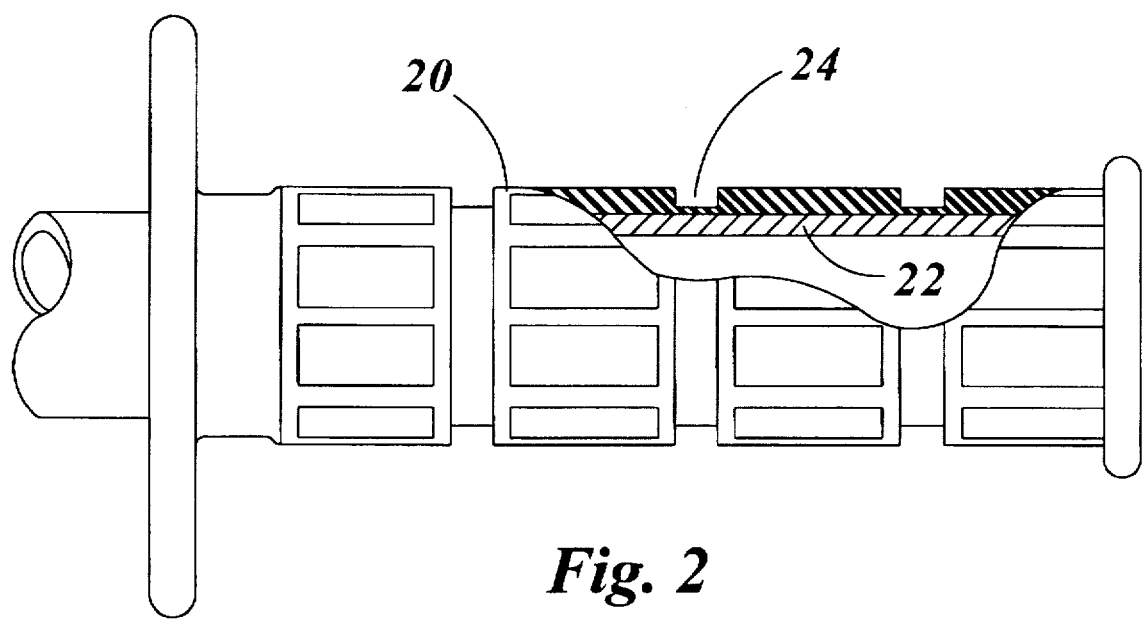
FIG. 2 is a view similar to FIG. 1, partially in section of a grip without the ties.

Referring now to FIG. 1 a handgrip 20 is shown installed on a handlebar 22 and secured thereto by three ties 10. Handgrip 20 has three annular grooves 24 formed at spaced intervals along its length. Longitudinal ribs 26 extend between grooves 24 and form part of the gripping surface. Ties 10 are secured about the grip 20 in the grooves 24 to compress the grip into tight contact (see FIG. 4) with the handlebar and prevent slippage thereabout. Rods 14 extend above the surface of grip 20 to provide a positive frictional contact with a hand placed about the grip 20 on a handlebar 22. While three grooves and ties with cylindrical rods have been shown any appropriate number of grooves and rod cross-section can be used as desired.

The grip 20 is made of any desired resilient material such as rubber, foam plastic, leather, or other natural or synthetic material that will provide the desired gripping and comfort characteristics. Ties 10 similarly may be made of any material strong enough to exert the required compression of the grip 20 to secure it to the bar 22. In one embodiment a polyethylene tie approximately ⅛th of an inch wide by about a 1/16 inch thick is used to secure the grip to the handlebar. Rods or studs 14 are about 1/16 inch in diameter and have a length of 1/16 inch. Rods 14 are spaced at intervals of about ¼ inch around the circumference of the tie 10. Other sizes and spacings may be used to optimize the ties and grip for its intended application without departing from the scope of the invention.

Figure 4:
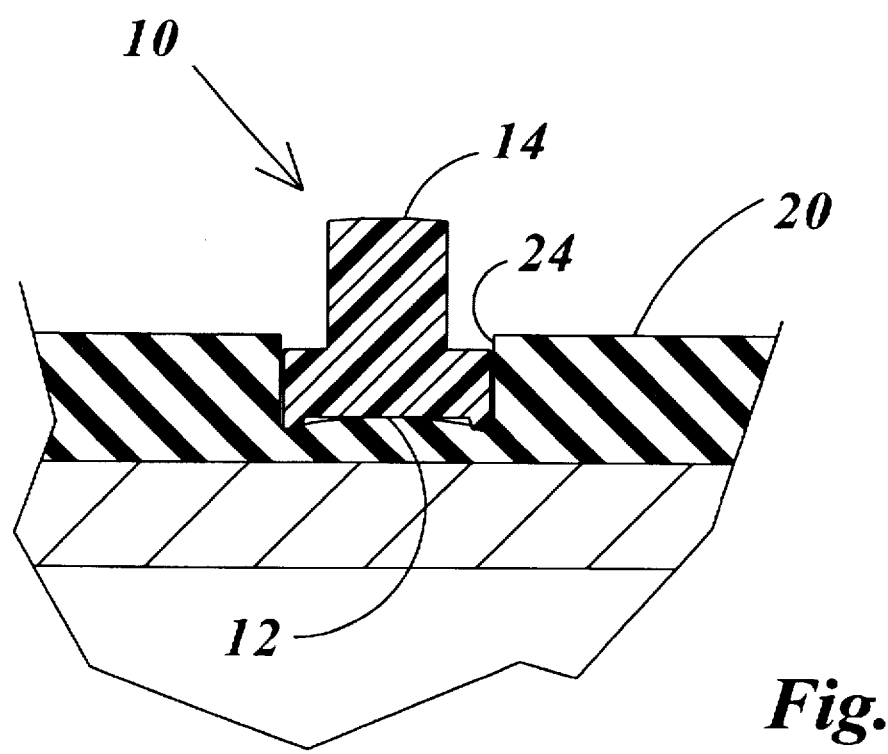
FIG. 4 is a partial cross-sectional view of a tie positioned in a groove.

Referring now to FIG. 4 the tie 10 when installed in one of the annular grooves 24 in the grip 20 and properly tightened compresses the bottom of the groove 24 into tight engagement with the handlebar 22 on which it is mounted. The edges 30 of the annular groove 12 further compress the resilient material of the grip 20 and provide additional gripping above that obtained by the full tie itself.

The tie 10 is installed about a grip 20 by inserting ratchet 18 end into the latching or locking receptacle 16 and positioning tie 10 in one of the annular grooves 24. By pulling the ratchet end 18 through lock 16 the tie 10 can be tightened about the grip 20. This may be aided by a pair of small pliers or other tool and the end 18 is pulled tight enough to secure the grip 20 to the handlebar 22 and prevent rotation or other slippage of the grip relative to the handlebar. After tightening, the rods 14 protrude beyond the surface of the grip 20 and will be engaged by the hand of an operator of the vehicle on which the grip is mounted. The rods 14 will deform slightly when the handgrip is grasped by the operator and imbed themselves somewhat into the operators hand. The rods 14 thus provide additional lateral and longitudinal friction to the operators hand without discomfort or injury. Excessive dirt, oil, water, mud and the like will not significantly decrease the frictional effect of the rods 14.

Finally the ties 10 are made in a variety of colors to match or contrast with the color and texture of the handgrips 20. Each tie may be a different color or sets of ties may be the same color. Different colors can be substituted by cutting off the prior tie and applying a new one. Also if a set of ties becomes worn down they may similarly be replaced to renew the frictional grip without replacing the handgrip 20 itself.

While there are given above certain specific examples of this invention and its application in practical use, it should be understood that they are not intended to be exhaustive or to be limiting of the invention. On the contrary, these illustrations and explanations herein are given in order to acquaint others skilled in the art with this invention and the principles thereof and a suitable manner of its application in practical use, so that others skilled in the art may be enabled to modify the invention and to adapt and apply it in numerous forms each as may be best suited to the requirement of a particular use.

I claim:

1. A handgrip tie and a tubular resilient handgrip member for selective engagement with a generally cylindrical handle member to provide an improved attachment to, and frictional gripping surface on, said handle member which comprises in combination:

a resilient tubular handgrip member having inner and outer surfaces;

a handgrip tie having an elongated narrow tie body portion having first and second ends, and a length greater than the circumference of said tubular resilient handgrip member to be secured by said handgrip tie;

a latching member formed on said first end of said tie body portion;

a tightening member formed on said second end of said tie body portion;

said tie body portion having a generally rectangular cross-section and substantially flat inner and outer surfaces;

said flat inner tie body surface being adapted to form a smooth continuous compressive contact with said resilient handgrip member when said tie is tightened about said handgrip member positioned on a handle member; and a plurality of short studs spaced along substantially the entire outer surface of said tie body portion and extending generally perpendicular thereto;

whereby when said tie is tightened about a resilient handgrip member positioned on a handle member said short studs will extend generally radially outwardly from said tubular resilient handgrip member to form an increased frictional gripping surface for said handle member.

2. A handgrip member and tie in accordance with claim 1 wherein said studs are short cylindrical rods spaced about the outer surface of said tie.

3. A handgrip member and tie according to claim 2 wherein said studs extend outwardly a distance sufficient to project above the outer surface of said tubular resilient handgrip member after it is applied thereto.

4. A handgrip member and tie according to claim 3 wherein said tie has a width of one-sixteenth to one-quarter inch; a thickness of one-thirty second to one-eighth inch; and said studs have a length of from one-eighth to one quarter inch and a diameter of from one sixteenth to one eighth of an inch.

* * * * *